(12) United States Patent
Maeda et al.

(10) Patent No.: US 7,932,335 B2
(45) Date of Patent: *Apr. 26, 2011

(54) FLUORINE-CONTAINING ELASTOMER AND COMPOSITION THEREOF

(75) Inventors: Mitsuru Maeda, Kitaibaraki (JP); Takashi Enokida, Kitaibaraki (JP); Keisuke Kokin, Kitaibaraki (JP); Satoru Saito, Kitaibaraki (JP); Jun Kanega, Kitaibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/793,861

(22) PCT Filed: Apr. 20, 2007

(86) PCT No.: PCT/JP2007/058592
§ 371 (c)(1),
(2), (4) Date: Jun. 21, 2007

(87) PCT Pub. No.: WO2008/093436
PCT Pub. Date: Aug. 7, 2008

(65) Prior Publication Data
US 2010/0004415 A1    Jan. 7, 2010

(30) Foreign Application Priority Data

Jan. 29, 2007  (JP) ................................. 2007-017295

(51) Int. Cl.
C08F 16/24  (2006.01)

(52) U.S. Cl. ....... 526/247; 526/249; 526/255; 428/66.4; 277/915; 277/945

(58) Field of Classification Search .................. 526/247, 526/249, 255; 428/66.4; 277/915, 945
See application file for complete search history.

(56) References Cited

U.S. PATENT DOCUMENTS

| | | | | |
|---|---|---|---|---|
| 4,487,903 A | * | 12/1984 | Tatemoto et al. | 526/247 |
| 7,312,289 B2 | * | 12/2007 | Saito et al. | 526/247 |
| 2004/0181022 A1 | * | 9/2004 | Saito et al. | 526/247 |

FOREIGN PATENT DOCUMENTS

| | | |
|---|---|---|
| EP | 1462465 | 3/2003 |
| JP | 53-003495 | 1/1978 |
| JP | 61-223007 | 10/1986 |
| JP | 54-1585 | 1/1988 |
| JP | 2002-037818 | 2/2002 |
| JP | 2004-346087 | 12/2004 |
| JP | 2005-320499 A | 11/2005 |

OTHER PUBLICATIONS

International Opinion of the International Search Authority from corresponding PCT application No. PCT/JP2007/058592, dated Aug. 13, 2009 (3 pages).
International Preliminary Report from corresponding PCT application No. PCT/JP2007/058592, dated Aug. 13, 2009 (2 pages).

* cited by examiner

*Primary Examiner* — Mark Eashoo
*Assistant Examiner* — Nicole M Buie-Hatcher
(74) *Attorney, Agent, or Firm* — Brinks Hofer Gilson & Lione

(57) ABSTRACT

A fluorine-containing elastomer having a copolymer composition, which comprises (a) 50-85 mol. % of vinylidene fluoride, (b) 0-25 mol. % of tetrafluoroethylene, (c) 7-20 mol. % of perfluoro(methyl vinyl ether), (d) 2.5-15 mol. % of $CF_2$=$CFO[CF_2CF(CF_3)O]nCF_3$ (n: 2-6), (e) 0.1-2 mol. % of $CF_2$=$CFO[CF_2CF(CF_3)O]mCF_2CF_3$ (m: 2-6), and (f) 0.1-2 mol. % of RfX (Rf: an unsaturated fluorohydrocarbon group having 2-8 carbon atoms, which can contain at least one ether bond, X: bromine or iodine), can provide a fluorine-containing elastomer composition, which comprises 100 parts by weight of the fluorine-containing elastomer, 0.1-10 parts by weight of an organic peroxide, 0.1-10 parts by weight of a polyfunctional unsaturated compound, and at least 2 parts by weight of an acid acceptor. The composition can give vulcanizates having a distinguished elongation at break at high temperatures such as 100° C., and distinguished compression set characteristics at low temperatures such as 0° C.

14 Claims, No Drawings

US 7,932,335 B2

FLUORINE-CONTAINING ELASTOMER AND COMPOSITION THEREOF

RELATED APPLICATIONS

The present application is a 35 U.S.C. §371 national stage filing of International Patent Application No. PCT/JP2007/058592, filed Apr. 20, 2007, to which priority is claimed under 35 U.S.C. §120 and through which priority is claimed under 35 U.S.C. §119 to Japanese Priority Patent Application No. 2007-017295, filed Jan. 29, 2007.

TECHNICAL FIELD

The present invention relates to a fluorine-containing elastomer and a composition thereof, and more particularly to a fluorine-containing elastomer capable of giving vulcanizates with distinguished molding processability, low-temperature characteristics, and solvent resistance, and a composition thereof.

BACKGROUND ART

Fluorine-containing elastomers comprising vinylidene fluoride-tetrafluoroethylene-perfluoro(methyl vinyl ether) as the main structural unit have not only distinguished heat resistance and solvent resistance peculiar to the fluorine-containing elastomer, but also have good low-temperature characteristics, and thus have been so far used in many industrial fields including the automobile industry. However, even the fluorine-containing elastomers often fails to satisfy the recent technical progress, where particularly more strict requirements for the low-temperature characteristics and resistance to alcoholic solvents such as methanol, etc. are imposed. Due to the recent exhaust gas regulations, etc., further requirements for the heat resistance, solvent resistance, and low-temperature characteristics have been also imposed on the fluorine-containing elastomers.

To solve the problems, it has been so far proposed to prepare the fluorine-containing elastomer by copolymerizing a monomer having a plurality of ether bonds on the side chains in place of perfluoro(methyl vinyl ether), where the monomer must be copolymerized in a high proportion to obtain copolymers in an elastomeric state, whereas in a low proportion only semi-resinous state copolymers will be obtained, resulting in deterioration of the low-temperature characteristics. Actually, 12-50% by mole is recommended for the copolymerization proportion of the monomer, and all of Examples in the following reference teach copolymerization proportions of 25-32% by mole. However, such fluorine-containing elastomer containing the monomer in a high proportion shows a poor mechanical strength and moreover has such a problem as a poor molding processability, e.g. easy occurrence of foaming at the time of molding.

Patent Literature 1: JP-B-5-13961

Perfect fuel oil resistance is required for automobile fuel seal materials, and thus commercially available fluororubber is now used mainly for this purpose. Besides the ordinary gasoline, oxygen-containing fuels such as ether, alcohol, etc. have been now used as automobile fuels from the viewpoint of combustion efficiency, etc. Fluororubber having an increased fluorine content can respond to the oxygen-containing fuel, but the increased fluorine content can deteriorate the cold resistance, giving rise to fear of fuel leakage in winter cold districts, whereas a decreased fluorine content can improve the cold resistance, but can lose the resistance to the oxygen-containing fuel. It is now very hard to satisfy these two requirements at the same time.

DISCLOSURE OF THE INVENTION

Problem to be Solved by the Invention

The present applicants previously proposed a fluorine-containing elastomer capable of giving vulcanizates having distinguished low-temperature characteristics and solvent resistance, without deteriorating the molding processability and compression set characteristics originally possessed by the fluorine-containing elastomer, which comprises:

| | |
|---|---|
| (a) vinylidene fluoride | 50-85 mol. % |
| (b) tetrafluoroethylene | 0-25 mol. % |
| (c) perfluoro(methyl vinyl ether) | 7-20 mol. % |
| (d) $CF_2=CFO[CF_2CF(CF_3)O]nCF_3$ (where n is an integer of 2-6) | 3-15 mol. % |
| (e) RfX (where Rf is an unsaturated fluorohydrocarbon group having 2-8 carbon atoms, which can contain at least one ether bond, and X is bromine or iodine) | 0.1-2 mol. % |

Patent Literature 2: JP-A-2004-346087

The proposed fluorine-containing elastomer can satisfy the afore-mentioned desired characteristics, and can show a more distinguished low-temperature characteristics particularly when n is an integer of 4-6 in Component (d), than that when n is an integer of 2-3, so long as the copolymerization proportion is the same, and also can give equivalent low-temperature characteristics even in a lower copolymerization proportion.

The vulcanizates of the proposed fluorine-containing elastomer having such characteristics can be effectively used as automobile fuel seal materials, etc. In view of such situations that engine room insides are exposed to low temperatures in an engine stop state in cold districts, whereas to high temperatures in an engine driving state, ultracold-resistant fluorine-containing elastomers are still more desired to withstand such severe use circumstances.

An object of the present invention is to provide a fluorine-containing elastomer capable of giving vulcanizates having a distinguished elongation at break at high temperatures such as 100° C., and distinguished compression set characteristics at low temperatures such as 0° C., and a composition thereof.

Means for Solving the Problem

The object of the present invention can be attained by a fluorine-containing elastomer, which comprises:

| | |
|---|---|
| (a) vinylidene fluoride | 50-85 mol. % |
| (b) tetrafluoroethylene | 0-25 mol. % |
| (c) perfluoro(methyl vinyl ether) | 7-20 mol. % |
| (d) $CF_2=CFO[CF_2CF(CF_3)O]nCF_3$ (where n is an integer of 2-6) | 2.5-15 mol. % |
| (e) $CF_2=CFO[CF_2CF(CF_3)O]mCF_2CF_3$ (where m is an integer of 2-6) | 0.1-2 mol. % |
| (f) RfX (where Rf is an unsaturated fluorocarbon group having 2-8 carbon atoms, which can contain at least one ether bond, and X is bromine or iodine) | 0.1-2 mol. % |

The fluorine-containing elastomer can be obtained by copolymerization preferably in the presence of a bromine- and/or iodine-containing compound, represented by the general formula R(Br)n(I)m (where R is a saturated fluorohydrocarbon group or a saturated chlorofluorohydrocarbon group, each having 2-6 carbon atoms, and n and m are each 0, 1 or 2, and m+n is 2).

The fluorine-containing elastomer can provide a fluorine-containing elastomer composition by addition of 0.1-10 parts by weight of an organic peroxide, 0.1-10 parts by weight of a polyfunctional unsaturated compound, and at least 2 parts by weight of an acid acceptor to 100 parts by weight of the fluorine-containing elastomer.

EFFECT OF THE INVENTION

The present fluorine-containing elastomer can give vulcanizates having distinguished low-temperature characteristics (glass transition temperature) and solvent resistance (methanol resistance) in addition to the heat resistance, molding processability, and compression set characteristics, originally possessed by the fluorine-containing elastomer, and thus can be effectively used as molding materials for O rings, oil seals, fuel hoses, etc.

Particularly, the peroxide-crosslinked fluorine-containing elastomer has a distinguished elongation at break at high temperatures such as 100° C. and distinguished compression set characteristics at low temperatures such as 0° C., and thus can be effectively used as automobile fuel seal materials capable of withstanding use in cold districts, more specifically severe use circumstances such that the engine room inside is exposed to low temperatures in an engine stop state in cold districts, whereas to high temperatures in an engine driving state.

BEST MODES FOR CARRYING OUT THE INVENTION

The present fluorine-containing elastomer has such copolymer composition proportions as (a) 50-85 mol. %, preferably 60-85 mol. %, of vinylidene fluoride, (b) 0-25 mol. %, preferably 0-20 mol. %, of tetrafluoroethylene, (c) 7-20 mol. %, preferably 7-15 mol. %, of perfluoro(methyl vinyl ether), (d) 2.5-15 mol. %, preferably 3-10 mol. %, of $CF_3$-terminated perfluoro vinyl ether, represented by the afore-mentioned general formula, (e) 0.1-2 mol. %, preferably 0.5-1 mol. %, of $CF_2CF_3$-terminated perfluoro vinyl ether, represented by the afore-mentioned general formula, and (f) 0.1-2 mol. %, preferably 0.3-1.5 mol. %, of a bromine- or iodine-containing unsaturated compound, represented by the afore-mentioned general formula, where the composition proportions are selected in ranges capable of giving vulcanizates having desired low-temperature characteristics and solvent resistance. When the copolymer composition proportion of component (e) is less than 0.1 mol. %, the desired cold resistance can not be attained, whereas when copolymerized in a proportion of more than 2 mol. %, the elongation at break at high temperature will be lowered.

Vinylidene fluoride of Component (a) is copolymerized with each of the following Components (b)-(f).

Further copolymerization of tetrafluoroethylene of Component (b) can remarkably improve the solvent resistance, where the low-temperature characteristics will be deteriorated in too high a copolymer composition proportion, and thus to proportion of 35 mol. % or less, preferable 20 mol. % or less can be recommended. Copolymerization of Component (b) can also remarkably improve the resistance to fuels mixed with an oxygen-containing compound such as methanol.gasoline mixed fuel, ethanol.gasoline mixed fuel, etc., and alcoholic fuel such as methanol, ethanol, etc.

Perfluoro(methyl vinyl ether) of Component (c) can give a flexibility to the resulting copolymer, and is also an essential component for improving the low-temperature characteristics, particularly $TR_{70}$ values in the TR test.

$CF_3$-terminated perfluoro vinyl ether of Component (d) for used herein can be a single component selected from the compounds represented by the general formula, or a mixture of at least two compounds having various n values. As similar perfluoro vinyl ethers thereto, compounds represented by the following general formula are known:

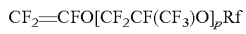

(where Rf: perfluoroalkyl groups of $C_1$-$C_3$, and p: an integer of 1-3). Copolymerization of a monomer having a perfluoropropyl group as deemed to be particularly preferable Rf group can give the low-temperature characteristics, though lowering of molecular weight, lowering of molding processability such as occurrence of foaming, etc. at the time of molding, lowering of mechanical strength, etc. are encountered. Such a compound can be copolymerized within such a range as not to deteriorate the desired properties, for example, in a proportion of 1 mol. % or less.

Patent Literature 3: JP-A-2002-37818

$CF_3$-terminated perfluoro vinyl ether of Component (d), represented by the afore-mentioned general formula, can be obtained by reaction of $CF_3OCF(CF_3)COF$ with hexafluoropropene oxide in the presence of a cesium fluoride catalyst, a diglyme solvent, etc., followed by reaction with anhydrous potassium carbonate, and by thermal decomposition reaction, where the product is a mixture of n=2-6, but individual perfluorovinyl ethers having various n values can be separated from one another by fractional distillation, and can be used as single compounds. Particularly, n=4-6 is preferable from the viewpoint of low-temperature characteristics. Or the mixture can be also used, as such without fractional distillation.

$CF_2CF_3$-terminated perfluoro vinyl ether of Component (e) for use herein is a single component selected from the compounds, represented by the afore-mentioned general formula, or can be a mixture of at least two compounds having various n values. Such a perfluoro vinyl ether can be obtained by reaction of $CF_3CF_2OCF(CF_3)COF$ with hexafluoropropene oxide in the presence of a cesium fluoride catalyst, a diglyme solvent, etc., followed by reaction with anhydrous potassium carbonate, and by thermal decomposition reaction, where the product is a mixture of m=2-6, but individual perfluoro vinyl ethers having various n values can be separated from one another by fractional distillation, and can be used as single compounds. Particularly, m=4-6 is preferable from the viewpoint of low-temperature characteristics. Or the mixture can be also used as such without fractional distillation.

Bromine- or iodine-containing compound of Component (f) for use herein includes, for example, $CF_2$=$CFOCF_2CF_2Br$, $CF_2$=$CFOCF_2CF(CF_3)OCF_2CF_2Br$, $CF_2$=$CFBr$, $CF_2$=$CHBr$, $CF_2$=$CFI$, $CF_2$=$CHI$, etc., where the Rf group is an unsaturated fluorohydrocarbon group having 2-8 carbon atoms, which can contain at least one ether bond (see the following Patent Literature 4). $CF_2$=$CFOCF_2CF_2Br$, $CF_2$=$CFI$, and $CF_2$=$CHI$ can be preferably used.

To adjust the molecular weight of the present fluorine-containing elastomer copolymer, or to improve the molding processability, particularly to suppress occurrence of foaming at the time of curing step, it is very effective to conduct the copolymerization reaction in the presence of a bromine- and/or iodine-containing compound, represented by the following general formula:

R(Br)n(I)m

Patent Literature 4: JP-B-54-1585

Such compounds include, for example $ICF_2CF_2CF_2FC_2I$, $ICF_2CF_2CF_2CF_2Br$, $ICF_2CF_2Br$, etc., and $ICF_2CF_2CF_2F_2I$, is particularly preferable from the viewpoint of curing characteristics, etc. Other examples are disclosed in the following Patent Literatures 5 and 6.

Patent Literature 5: JP-A-63-308008

Patent Literature 6: JP-B-48-4728

Such compounds act as a chain transfer agent to adjust the molecular weights of the resulting copolymers. As a result of the chain transfer reaction, copolymers having a bromine atom and/or an iodine atom bonded to the molecule terminal can be obtained, with the result that the bonded sites act as curing sites at the time of vulcanization molding step. However, when such compounds are used in a larger proportion, the mechanical properties of the ultimate molding products will be lowered. Thus, the recommended proportion is about 1 wt. % or less, preferably about 0.5 to about 0.01 wt. %, on the basis of the weight of total monomers.

To improve the compression set characteristics of the vulcanization molding products, the following perfluoro divinyl ether can be copolymerized in a proportion of about 1 wt. % or less, preferably about 0.5 to about 0.1 wt. % on the basis of the weight of total monomers from the viewpoint of the mechanical properties of the molding products:

$CF_2=CFOCF_2CF(CF_3)OCF_2CF_2OCF=CF_2$

Other monomers, for example, fluorine-containing monomers such as trifluoroethylene, hexafluoropropene, chlorotrifluoroethylene, etc. can be further polymerized in such a range as not to deteriorate the desired properties of the present fluorine-containing elastomer.

The present fluorine-containing elastomer can be prepared by an aqueous emulsion polymerization process or by an aqueous suspension polymerization process. The aqueous emulsion polymerization process can use a reaction initiator system based on either single water-soluble peroxide or a redox system of a water-soluble peroxide and a water-soluble reducing compound. The water-soluble peroxide for use herein includes, for example, ammonium persulfate, potassium persulfate, sodium persulfate, etc., whereas the water-soluble reducing compound for use herein includes, for example, sodium sulfite, sodium hydrogen sulfite, etc. As a stabilizer for the aqueous emulsion, a pH-adjusting agent (buffer), such as sodium monohydrogen phosphate, sodium dihydrogen phosphate, potassium monohydrogen phosphate, potassium dihydrogen phosphate, etc. can be used.

An emulsifier for use in the emulsion polymerization process includes, generally, a fluorinated carboxylate (see the afore-mentioned Patent Literature 1), preferably the following compound:

$CF_3CF_2CF_2O[CF(CF_3)CF_2O]nCF(CF_3)COONH_4$ n: 1 or 2

The emulsifier can be used as an aqueous solution containing about 1 to about 30 wt. %, preferably about 5 to about 20 wt. %, thereof. When the amount of the emulsifier is less than about 1 wt. %, monomers and the resulting copolymers can not be uniformly dispersed in the aqueous medium, whereas too large an amount thereof will make the process economically disadvantageous.

Copolymerization reaction is carried out at a temperature of about 20° to about 80° C., preferably about 25° to about 60° C. Too high a polymerization temperature will give rise to such problems as occurrence of foaming at the time of molding processing and deterioration of compression set characteristics of vulcanization molding products. Polymerization pressure for use herein is generally about 5 MPa or less.

The resulting fluorine-containing elastomer has a glass transition temperature Tg of −30° to −45° C. The molecular weight of the resulting copolymer is not particularly limited, but it is desirable that the number average molecular weight Mn (GPC method; tetrahydrofuran solvent) is about 10,000 to about 1,000,000, preferably about 50,000 to about 300,000. Desirably, solution viscosity ηsp/c (35° C., 1 wt. % methyl ethyl ketone solution) as an index of molecular weight is about 0.1 to about 2 dl/g, preferably about 0.2 to about 1 dl/g.

The present fluorine-containing elastomer having such properties can be cured by so far well-known various vulcanization processes, such as a peroxide vulcanization process, a polyamine vulcanization process, and polyol vulcanization process, or an irradiation process by radiation rays, electron beams, etc., preferably the peroxide vulcanization process using an organic peroxide can provide vulcanizates having distinguished mechanical strength and forming carbon-carbon bonds in a stable cross-linking structure, resulting in distinguished chemical resistance, abrasion resistance, solvent resistance, etc.

Organic peroxide for use in the peroxide vulcanization process includes, for example, 2,5-dimethyl-2,5-bis(t-butylperoxy)hexane, 2,5-dimethyl-2,5-bis(t-butylperoxy)hexine-3, benzoyl peroxide, bis(2,4-dichlorobenzoyl)peroxide, dicumyl peroxide, di-t-butyl peroxide, t-butyl cumyl peroxide, t-butylperoxybenzene, 1,1-bis(t-butylperoxy)-3,5,5-trimethylcyclohexane, 2,5-dimethylhexane-2,5-dihydroxyperoxide, α,α'-bis(t-butylperoxy)-p-diisopropylbenzene, 2,5-dimethyl-2,5-di(benzylperoxy)hexane, t-butylperoxyisopropyl carbonate, etc.

In the peroxide vulcanization process using such organic peroxides, it is preferable to use a polyfunctional unsaturated compound as a cocrosslinking agent at the same time, such as tri(meth)allyl isocyanurate, tri(meth)allyl cyanurate, triallyl trimellitate, N,N'-m-phenylene bismaleimide, diallyl phthalate, tris(diallylamine)-s-triazine, triallyl phosphite, 1,2-polybutadiene, ethylene glycol diacrylate, diethylene glycol diacrylate, etc. By simultaneous use of the cocross-linking agent, vulcanizates having much more distinguished vulcanization characteristics, mechanical strength, compression set characteristics, etc. can be obtained.

Furthermore, hydrotalcite, oxides or hydroxides of divalent metals, such as oxides or hydroxides of calcium, magnesium, lead, zinc, etc. can be also used as acid acceptor.

The foregoing components are added to the peroxide vulcanization system in the following proportions on the basis of 100 parts by weight of the present fluorine-containing elastomer: about 0.1 to about 10 parts by weight, preferably about 0.5 to about 5 parts by weight, of an organic peroxide, about 0.1 to about 10 parts by weight, preferably about 0.5 to about 5 parts by weight, of a cocross-linking agent, if required, and furthermore at least about 2 parts by weight, preferably about 3 to about 20 parts by weight, of an acid acceptor. When the acid acceptor is used in a proportion of less than about 2 parts by weight, the corrosion resistance to metals will be deteriorated.

For the vulcanization, so far well known fillers, reinforcing agents, plasticizers, lubricants, processing aids, pigments, etc. can be appropriately added thereto, besides the aforementioned components. Carbon black as a filler or a reinforcing agent can be used generally in a proportion of about 10 to about 50 parts by weight on the basis of 100 parts by weight of the present fluorine-containing elastomer.

Addition of fine bituminous powders can improve the compression set characteristics and can contribute to elongation of the life of seal materials, etc. due to the improvement of heat resistance, whereas addition of a flat filler can improve the fuel oil blockability, contributing to more strict prevention of automobile fuel, etc. as a sealing target from transpiration.

As fine bituminous powders, those obtained by pulverizing bituminous materials such as coal, etc. to fine powers having an average particle size of about 10 μm or less, generally about 1 to about 10 μm, preferably about 3 to about 8 μm, can be used. Above an average particle size of about 10 μm, the strength at break or elongation at break of rubber will be lowered, resulting in deterioration of practical strength. Actually, commercially available products such as Mineral Black 325BA of Keystone Filler & Mfg. Co., etc. can be used as such. The fine bituminous powders can be used in a proportion of about 40 parts by weight or less, preferably about 5 to about 30 parts by weight, on the basis of 100 parts by weight of the present fluorine-containing elastomer. Above about 40 parts by weight the viscosity of the resulting composition will be too high, giving rise to troubles at the time of kneading or molding.

The flat filler for use herein is at least one of clay, mica, graphite, molybdenum disulfide, etc. which have an average particle size of about 0.5 to about 50 μm, preferably about 5 to about 30 μm, and an aspect ratio of 3 or more, preferably 5-30. When the average particle size is less than about 0.5 μm, or the aspect ratio is less than 3, the fuel blockability is no more improved, whereas the average particle size is more than about 50 μm, the strength at break or elongation at break of rubber will be lowered, resulting in deterioration of practical strength. The flat filler can be used in a proportion of about 40 parts by weight or less, preferably about 5 to about 30 parts by weight, on the basis of 100 parts by weight of the present fluorine-containing elastomer. Above 40 parts by weight the viscosity of the resulting composition will be increased, resulting in failure of kneading, and deterioration of sealability due to much higher hardness of cross-linked seal materials.

The afore-mentioned components are kneaded by ordinary mixing methods, for example, by roll mixing, kneader mixing, Banbury mixing, solution mixing, etc., and the kneaded products are vulcanized generally by press vulcanization at about 100° to about 250° C. for about 1 to about 60 minutes, and preferably furthermore by oven vulcanization (secondary vulcanization) at about 150° to about 250° C. within about 30 hours.

By the organic peroxide cross-linking, the present fluorine-containing elastomer can give vulcanizates having the following low-temperature characteristics:

$$-43° C. \leq TR_{10} < -30° C. < TR_{70} \leq -20° C.$$

where $TR_{10}$ and $TR_{70}$ values show temperatures for 10% or 70% recoveries, from the initial elongation, respectively, when samples are elongated by 50% in TR tests, vitrificated by lowering the temperature to less than glass transition temperature Tg, and strain-relaxed by gradually increasing the temperature.

To satisfy the conditions for the $TR_{10}$ and $TR_{70}$ values it is desirable to make sum total in combination of perfluoro(methyl vinyl ether) of Component (c) with perfluoro vinyl ethers of Components (d) and (e) to 10 mol. % or more, preferably 15 mol. % or more, more preferably 15-37 mol. %. When the sum total in the combination is less than 10 mol. %, the resulting copolymer will be brought into a semi-resinous state or the low-temperature characteristics, particularly $TR_{70}$ value, will be deteriorated.

EXAMPLES

The present invention will be described in detail below, referring to Examples.

Reference Example 1

36 g of cesium fluoride, 360 g of diglyme, and 4.18 kg of $CF_3OCF(CF_3)COF$ were charged into a stainless steel autoclave having a capacity of 10 L, provided with a stirrer, stirred overnight, and then cooled to −10° C., and 12.0 kg of hexafluoropropene oxide was added thereto at a feed rate of 150 g/hr. After the end of addition, the mixture was further stirred for 2 hours, while keeping that temperature, and then returned to room temperature. Then, stirring was discontinued, and the mixture was allowed to stand. Then, only the fluorocarbon phase was carefully withdrawn from the lower outlet of the autoclave. 15.9 kg of the fluorocarbon phase thus obtained was analyzed by gas chromatography (GC), and found to have the following composition:

| $CF_3O[CF(CF_3)CF_2O]nCF(CF_3)COF$ | |
|---|---|
| n | GC (%) |
| 2 | 1 |
| 3 | 27 |
| 4 | 50 |
| 5 | 20 |
| 6 | 2 |

1.2 kg of the resulting fluorocarbon phase and 1.2 kg of anhydrous potassium carbonate were charged into a glass reactor vessel having a capacity of 10 L, provided with a stirrer, and heated to 130° C. After completion of carbon dioxide gas generation, the vessel inside pressure was reduced to 1 Torr to recover unreacted fluorocarbon mixture and a very small amount of diglyme (total: 30 g). Then, the vessel inside pressure was returned to the normal pressure, and reaction was conducted at 200°-270° C. for 10 hours to obtain the following compounds. The resulting liquid was recovered by a cold trap. 1.0 kg of the resulting product was analyzed by GC and found to have the following composition. Vinylation reaction proceeded substantially quantitatively (90% or more), and thus the composition was not changed substantially before and after the reaction.

| $CF_2=CFO[CF_2CF(CF_3)O]nCF_3$ | |
|---|---|
| n | GC (%) |
| 2 | 1 |
| 3 | 27 |
| 4 | 50 |
| 5 | 20 |
| 6 | 2 |

The resulting vinyl ether compounds were distilled to isolate the individual compounds having the respective n values from one another. The individual compounds were identified by $^{19}F$-NMR (chemical shift was based on $CFCl_3$).

(n = 2)MPr₂VE $$\underset{F^b}{\overset{F^a}{\diagdown}}C=C\underset{OCF_2^dCF^eOCF_2^fCF^gOCF_3^h}{\overset{F^c}{\diagup}}$$
$$\phantom{OCF_2^dCF^e}\underset{CF_3^f}{|}\phantom{OCF_2^f}\underset{CF_3^f}{|}$$

| | δ/ppm |
|---|---|
| $F^a$ | −114.2 |
| $F^b$ | −121.6 |
| $F^c$ | −135.2 |
| $F^d$ | −83.5 |
| $F^e$ | −143.3 |
| $F^f$ | −78.9 |
| $F^g$ | −144.4 |
| $F^h$ | −52.8 |

(n = 3)MPr₃VE

| | δ/ppm |
|---|---|
| $F^a$ | −114.2 |
| $F^b$ | −121.6 |
| $F^c$ | −135.3 |
| $F^d$ | −83.5 |
| $F^e$ | −143.2 |
| $F^f$ | −78.9 |
| $F^g$ | −144.5 |
| $F^h$ | −52.9 |

(n = 4)MPr₄VE

| | δ/ppm |
|---|---|
| $F^a$ | −114.2 |
| $F^b$ | −121.6 |
| $F^c$ | −135.3 |
| $F^d$ | −83.4 |
| $F^e$ | −143.1 |
| $F^f$ | −78.8 |
| $F^g$ | −144.5 |
| $F^h$ | −52.9 |

(n = 5)MPr₅VE

| | δ/ppm |
|---|---|
| $F^a$ | −114.1 |
| $F^b$ | −121.7 |
| $F^c$ | −135.3 |
| $F^d$ | −83.5 |
| $F^e$ | −143.1 |
| $F^f$ | −78.9 |
| $F^g$ | −144.5 |
| $F^h$ | −52.9 |

(n = 6)MPr₆VE

| | δ/ppm |
|---|---|
| $F^a$ | −114.1 |
| $F^b$ | −121.6 |
| $F^c$ | −135.3 |
| $F^d$ | −83.5 |
| $F^e$ | −143.1 |
| $F^f$ | −78.8 |
| $F^g$ | −144.5 |
| $F^h$ | −52.9 |

Reference Example 2

36 g of cesium fluoride, 360 g of diglyme, and 4.5 kg of $CF_3CF_2OCF(CF_3)COF$ were charged into a stainless steel autoclave having a capacity of 10 L, provided with a stirrer, stirred overnight, and then cooled to −10° C., and 12.0 kg of hexafluoropropene oxide was added thereto at a feed rate of 150 g/hr. After the end of addition, the mixture was further stirred for 2 hours, while keeping that temperature, and then returned to room temperature. Then, stirring was discontinued, and the mixture was allowed to stand. Then, only the fluorocarbon phase was carefully withdrawn from the lower outlet of the autoclave. 11.8 kg of the fluorocarbon phase thus obtained was analyzed by gas chromatography (GC), and found to have the following composition:

| $CF_3CF_2O[CF(CF_3)CF_2O]nCF(CF_3)COF$ | |
|---|---|
| n | GC (%) |
| 2 | 2 |
| 3 | 28 |
| 4 | 51 |
| 5 | 17 |
| 6 | 2 |

1.3 kg of the resulting fluorocarbon phase, and 1.3 kg of anhydrous potassium carbonate were charged into a glass reactor vessel having a capacity of 10 L, provided with a stirrer, and heated to 130° C. After completion of carbon dioxide gas generation, the vessel inside pressure was reduced to 1 Torr to recover unreacted fluorocarbon mixture and a very small amount of diglyme (total: 42 g). Then, the vessel inside pressure was returned to the normal pressure, and reaction was conducted at 200°-270° C. for 10 hours to obtain the following compounds. The resulting liquid was recovered by a cold trap. 1.0 kg of the resulting product was analyzed by GC, and found to have the following composition. Vinylation reaction proceeded substantially quantitatively (90% or more), and thus the composition was not changed substantially before and after the reaction.

| $CF_2=CFO[CF_2CF(CF_3)O]nCF_2CF_3$ | |
|---|---|
| n | GC (%) |
| 2 | 2 |
| 3 | 29 |
| 4 | 52 |
| 5 | 16 |
| 6 | 1 |

The resulting vinyl ether compounds were distilled to isolate the individual compounds having the respective n values from one another. The individual compounds were identified by $^{19}$F-NMR (chemical shift was based on $CFCl_3$).

(n = 2)$EPr_2VE$ $$F^a\phantom{xx}F^c$$
$$\phantom{xx}C=C$$
$$F^b\phantom{xx}OCF_2{}^dCF^eOCF_2{}^fCF^gOCF_2{}^hCF_3{}^i$$
$$\phantom{xxxxxxxxxx}|\phantom{xxxx}|$$
$$\phantom{xxxxxxxxx}CF_3{}^f\phantom{xx}CF_3{}^f$$

| | δ/ppm |
|---|---|
| $F^a$ | −114.2 |
| $F^b$ | −121.6 |
| $F^c$ | −135.1 |
| $F^d$ | −83.5 |
| $F^e$ | −143.4 |
| $F^f$ | −78.9 |
| $F^g$ | −144.4 |
| $F^h$ | −53.0 |
| $F^i$ | −86.9 |

(n = 3)$EPr_3VE$ $$F^a\phantom{xx}F^c$$
$$\phantom{xx}C=C$$
$$F^b\phantom{xx}OCF_2{}^dCF^eOCF_2{}^fCF^eOCF_2{}^fCF^gOCF_2{}^hCF_3{}^i$$
$$\phantom{xxxxxxxxxx}|\phantom{xxxx}|\phantom{xxxx}|$$
$$\phantom{xxxxxxxxx}CF_3{}^f\phantom{xx}CF_3{}^f\phantom{xx}CF_3{}^f$$

| | δ/ppm |
|---|---|
| $F^a$ | −114.2 |
| $F^b$ | −121.6 |
| $F^c$ | −135.2 |
| $F^d$ | −83.5 |
| $F^e$ | −143.4 |
| $F^f$ | −78.9 |
| $F^g$ | −144.4 |
| $F^h$ | −53.0 |
| $F^i$ | −86.9 |

(n = 4)$EPr_4VE$ $$F^a\phantom{xx}F^c$$
$$\phantom{xx}C=C$$
$$F^b\phantom{xx}OCF_2{}^dCF^eOCF_2{}^fCF^eOCF_2{}^fCF^eOCF_2{}^fCF^gOCF_2{}^hCF_3{}^i$$
$$\phantom{xxxxxxxxxx}|\phantom{xxxx}|\phantom{xxxx}|\phantom{xxxx}|$$
$$\phantom{xxxxxxxxx}CF_3{}^f\phantom{xx}CF_3{}^f\phantom{xx}CF_3{}^f\phantom{xx}CF_3{}^f$$

| | δ/ppm |
|---|---|
| $F^a$ | −114.1 |
| $F^b$ | −121.5 |
| $F^c$ | −135.2 |
| $F^d$ | −83.6 |
| $F^e$ | −143.3 |
| $F^f$ | −78.9 |
| $F^g$ | −144.4 |
| $F^h$ | −52.9 |
| $F^i$ | −86.9 |

(n = 5)EPr$_5$VE $$\underset{F^b}{\overset{F^a}{\phantom{C}}}C=\underset{OCF_2^dCF^eOCF_2^fCF^eOCF_2^fCF^eOCF_2^fCF^eOCF_2^fCF^gOCF_2^hCF_3^i}{\overset{F^c}{\phantom{C}}}$$
with CF$_3^f$ branches

| | δ/ppm |
|---|---|
| F$^a$ | −114.1 |
| F$^b$ | −121.5 |
| F$^c$ | −135.2 |
| F$^d$ | −83.6 |
| F$^e$ | −143.2 |
| F$^f$ | −78.8 |
| F$^g$ | −144.2 |
| F$^h$ | −52.8 |
| F$^i$ | −87.0 |

(n = 6)EPr$_6$VE $$\underset{F^b}{\overset{F^a}{\phantom{C}}}C=\underset{OCF_2^dCF^eOCF_2^fCF^eOCF_2^fCF^eOCF_2^fCF^eOCF_2^fCF^eOCF_2^fCF^gOCF_2^hCF_3^i}{\overset{F^c}{\phantom{C}}}$$
with CF$_3^f$ branches

| | δ/ppm |
|---|---|
| F$^a$ | −114.2 |
| F$^b$ | −121.4 |
| F$^c$ | −135.1 |
| F$^d$ | −83.4 |
| F$^e$ | −143.2 |
| F$^f$ | −78.8 |
| F$^g$ | −144.2 |
| F$^h$ | −52.8 |
| F$^i$ | −87.0 |

Example 1

A stainless steel autoclave having a capacity of 500 ml was internally flushed with a nitrogen gas, and after the deaeration the following reaction medium were charged thereto:

| | |
|---|---|
| Surfactant CF$_3$CF$_2$CF$_2$OCF(CF$_3$)CF$_2$OCF(CF$_3$)COONH$_4$ | 30 g |
| Na$_2$HPO$_4$•12H$_2$O | 0.5 g |
| Ion-exchanged water | 250 ml |

The autoclave was again internally flushed with a nitrogen gas, and after the deaeration the following reactant materials were charged thereto.

| | |
|---|---|
| Vinylidene fluoride [VdF] | 42 g |
| Perfluoro (methyl vinyl ether) [FMVE] | 28 g |
| CF$_2$=CFO[CF$_2$CF(CF$_3$)O]$_4$CF$_3$ [MPr$_4$VE] | 39 g |
| CF$_2$=CFO[CF$_2$CF(CF$_3$)O]$_4$CF$_2$CF$_3$ [EPr$_4$VE] | 5 g |
| CF$_2$=CFOCF$_2$CF$_2$Br [FBrVE] | 2 g |
| ICF$_2$CF$_2$CF$_2$CF$_2$I [DIOFB] | 0.5 g |

Then, the autoclave inside temperature was adjusted to 50° C., and 0.01 g of sodium hydrogen sulfite and 0.05 g of ammonium persulfate were added thereto each as an aqueous 0.3 wt. % solution to initiate polymerization reaction. After the reaction for 2 hours, the autoclave was cooled, and the residual gas was vented therefrom, and the resulting emulsion was taken therefrom, and admixed with an aqueous 5 wt. % calcium chloride solution to coagulate the polymer. By water washing and drying, 110 g of elastomeric copolymer (ηsp/c=0.41, Tg=−38.7° C.) having the following composition (by $^{19}$F-NMR method) was obtained.

| | |
|---|---|
| VdF | 78 mol. % |
| FMVE | 17 mol. % |
| MPr$_4$VE | 3.7 mol. % |
| EPr$_4$VE | 0.5 mol. % |
| FBrVE | 0.8 mol. % |

The following compounds were added to 100 parts by weight of the elastomeric copolymer:

| | Parts by weight |
|---|---|
| MT carbon black (Thermax N990, a product of Cancab Co.) | 30 |
| Triallyl isocyanurate (TAIC M60, a product of Nihon Kasei Co.) | 6 |
| Organic peroxide (Perhexa 25B-40, a product of NOF Corp.) | 1.4 |
| ZnO | 4 |

The mixture was kneaded through a two-roll mill, and the resulting curable composition was compression molded at 180° C. for 10 minutes to obtain 2 mm-thick sheets and O rings (P24), and further subjected to secondary vulcanization (oven vulcanization) at 200° C. for 10 hours.

The following tests were conducted at the time of vulcanization and also to the resulting vulcanizates:

Hardness test: To determine $t_{10}$, $t_{90}$, ML and MH values at 180° C., using a Monsanto disc rheometer Normal state physical properties: according to JIS K6251 and 6253, corresponding to ASTM D412

Elongation at heating: according to JIS K6251, corresponding to ASTM D412 (at 100° C.)
Compression set: To determine 200° C., 30° C. or 0° C./70 hrs values of P24 O rings according to ASTM D395 Method B
Low-temperature characteristics: To determine $TR_{10}$ and $TR_{70}$ values according to ASTM D1329
Methanol swelling test: To determine percent volume change after dipping in methanol at 25° C. for 70 hours Example 2 and Comparative Examples 1 to 3

In Example 1, the reactant materials were changed as given in the following Table 1, where yields of the resulting elastomeric copolymers, copolymer compositions (sum total of $MPr_4VE$ and $EPr_4VE$: 4.2 mol. %), solution viscosities η sp/c, and glass transition temperatures Tg (by SEIKO I SSC5200) are shown together.

TABLE 1

| Determination item | | Ex. 2 | Comp. Ex. 1 | Comp. Ex. 2 | Comp. Ex. 3 |
|---|---|---|---|---|---|
| [Reactant Materials] | | | | | |
| VdF | (g) | 42 | 42 | 42 | 42 |
| FMVE | (g) | 28 | 28 | 28 | 28 |
| $MPr_4VE$ | (g) | 34 | 44 | 16 | — |
| $EPr_4VE$ | (g) | 10 | — | 28 | 44 |
| FBrVE | (g) | 2 | 2 | 2 | 2 |
| DIOFB | (g) | 0.5 | 0.5 | 0.5 | 0.5 |
| [Copolymer yield] | | | | | |
| Yield | (g) | 107 | 111 | 108 | 108 |
| [Copolymer Composition] | | | | | |
| VdF | (mol. %) | 78 | 78 | 78 | 78 |
| FMVE | (mol. %) | 17 | 17 | 17 | 17 |
| $MPr_4VE$ | (mol. %) | 3.2 | 4.2 | 1.5 | — |
| $EPr_4VE$ | (mol. %) | 1 | — | 2.7 | 4.2 |
| FBrVE | (mol. %) | 0.8 | 0.8 | 0.8 | 0.8 |
| [Solution Viscosity] | | | | | |
| η sp/c | (dl/g) | 0.43 | 0.41 | 0.46 | 0.48 |
| [Glass Transition Temperature] | | | | | |
| Tg | (° C.) | −38.8 | −38.6 | −39.1 | −39.3 |

Curable compositions were prepared from elastomeric copolymers obtained in Example 2, and Comparative Examples 1 to 3, and vulcanized, in the same manner as in Example 1, and results of determination in the tests, conducted at the time of vulcanization and to the vulcanizates, are shown in the following Table 2, together with results of determination in Example 1.

TABLE 2

| Determination item | | Ex. 1 | Ex. 2 | Comp. Ex. 1 | Comp. Ex. 2 | Comp. Ex. 3 |
|---|---|---|---|---|---|---|
| [Curing test] | | | | | | |
| $t_{10}$ | (min.) | 0.5 | 0.5 | 0.5 | 0.5 | 0.6 |
| $t_{90}$ | (min.) | 1.7 | 1.7 | 1.7 | 1.8 | 1.9 |
| ML | (dN·m) | 0.5 | 0.4 | 0.4 | 0.4 | 0.4 |
| MH | (dN·m) | 10.3 | 10.5 | 10.0 | 10.5 | 10.3 |
| [Normal state physical properties] | | | | | | |
| Hardness | | 67 | 67 | 67 | 68 | 68 |
| 100% modulus | (MPa) | 5.5 | 5.8 | 5.8 | 5.6 | 5.7 |
| Strength at break | (MPa) | 11.3 | 11.5 | 11.8 | 11.9 | 11.1 |

TABLE 2-continued

| Determination item | | Ex. 1 | Ex. 2 | Comp. Ex. 1 | Comp. Ex. 2 | Comp. Ex. 3 |
|---|---|---|---|---|---|---|
| Elongation at break | (%) | 160 | 160 | 160 | 150 | 150 |
| [Elongation at heating] | | | | | | |
| 100° C. | (%) | 140 | 140 | 140 | 100 | 100 |
| [Compression set] | | | | | | |
| 200° C. for 70 hours | (%) | 31 | 32 | 31 | 34 | 35 |
| 30° C. for 70 hours | (%) | 40 | 41 | 46 | 42 | 42 |
| 0° C. for 70 hours | (%) | 52 | 53 | 63 | 52 | 50 |
| [Low-temperature characteristics] | | | | | | |
| $TR_{10}$ | (° C.) | −37.1 | −37.1 | −36.9 | −37.1 | −37.2 |
| $TR_{70}$ | (° C.) | −26.4 | −26.5 | −26.4 | −26.6 | −26.8 |
| [Methanol swelling test] | | | | | | |
| Percent volume change | (%) | +32 | +32 | +32 | +34 | +33 |

It is evident from the results shown in Table 2 that the vulcanizates of the present fluorine-containing elastomers have distinguished values in the elongation at break at high temperatures such as 100° C. and compression set characteristics at low temperatures such as 0° C., whereas Comparative Example 1 using no $EPr_4VE$ can satisfy the value of elongation at break at high temperatures but has a poor value of compression set at low temperatures, and Comparative Example 2 using more $EPr_4VE$ than $MPr_4VE$ and Comparative Example 3 using no $MPr_4VE$ can satisfy values of compression set at low temperatures, but have poor values of elongation at break at high temperatures.

The invention claimed is:

1. A fluorine-containing elastomer having a copolymer composition, which comprises the following components: (a) 50-85 mol % of vinylidene fluoride, (b) 0-25 mol % of tetrafluoroethylene, (c) 7-20 mol % of perfluoro(methyl vinyl ether), (d) 2.5-15 mol % of $CF_2=CFO(CF_2CF(CF_3)O)_nCF_3$, where n is an integer of 2-6, (e) 0.5-1 mol % of $CF_2=CFO(CF_2CF(CF_3)O)_mCF_2CF_3$ where m is an integer of 2-6, and (f) 0.1-2 mol % of RfX where Rf is an unsaturated fluorohydrocarbon group having 2-8 carbon atoms, which can contain at least one ether bond, and X is bromine or iodine.

2. A fluorine-containing elastomer according to claim 1, wherein in component (d) n is 4-6.

3. A fluorine-containing elastomer according to claim 1, wherein in component (e) n is 4-6.

4. A fluorine-containing elastomer according to claim 1, wherein in component (d), n is 4, and in component (e), m is 4, respectively.

5. A fluorine-containing elastomer according to claim 1, which has a solution viscosity η sp/c, 35° C., 1 wt. % methyl ethyl ketone solution, of 0.1-2 dl/g.

6. A fluorine-containing elastomer according to claim 1, which is obtained by copolymerization reaction in the presence of a bromine- and/or iodine-containing compound, represented by the following general formula:

R(Br)n(I)m where R is a saturated fluorohydrocarbon group, or saturated chlorofluorohydrocarbon group, each having 2-6 carbon atoms, and m and n are each 0, 1 or 2, and m+n is 2.

7. A fluorine-containing elastomer according to claim 6, wherein the bromine and/or iodine-containing compound is $ICF_2CF_2CF_2CF_2I$.

8. A fluorine-containing elastomer according to claim 1, which has a glass transition temperature Tg of −30° to −45° C.

9. A fluorine-containing elastomer according to claim 1, wherein a sum total of component (c), component (d), and component (e) is 10 mol. % or more.

10. A fluorine-containing elastomer according to claim 1, wherein the compound of Component (f) is $CF_2=CFOCF_2CF_2Br$, $CF_2=CFBr$, $CF_2=CHBr$, $CF_2=CFI$ or $CF_2=CHI$.

11. A fluorine-containing elastomer according to claim 1, which is capable of giving vulcanizates showing low-temperature characteristics according to ASTM D1329, as;

$-34°\ C.\leqq TR10<-30°\ C.<TR70\leqq -20°\ C.$ after organic peroxide cross-linking.

12. A fluorine-containing elastomer composition, which comprises 100 parts by weight of a fluorine-containing elastomer according to claim 1, 0.1-10 parts by weight of an organic peroxide, 0.1-10 parts by weight of a polyfunctional unsaturated compound, and at least 2 parts by weight of an acid acceptor.

13. A fluororubber-based seal material, which is obtained by cross-linking molding of a fluorine-containing elastomer composition according to claim 12.

14. An automobile fuel seal material which comprises a fluororubber-based seal material according to claim 13.

* * * * *